Jan. 5, 1943. J. FRENCH 2,307,581
BICYCLE TAIL AND STOP LIGHT
Filed Feb. 24, 1940
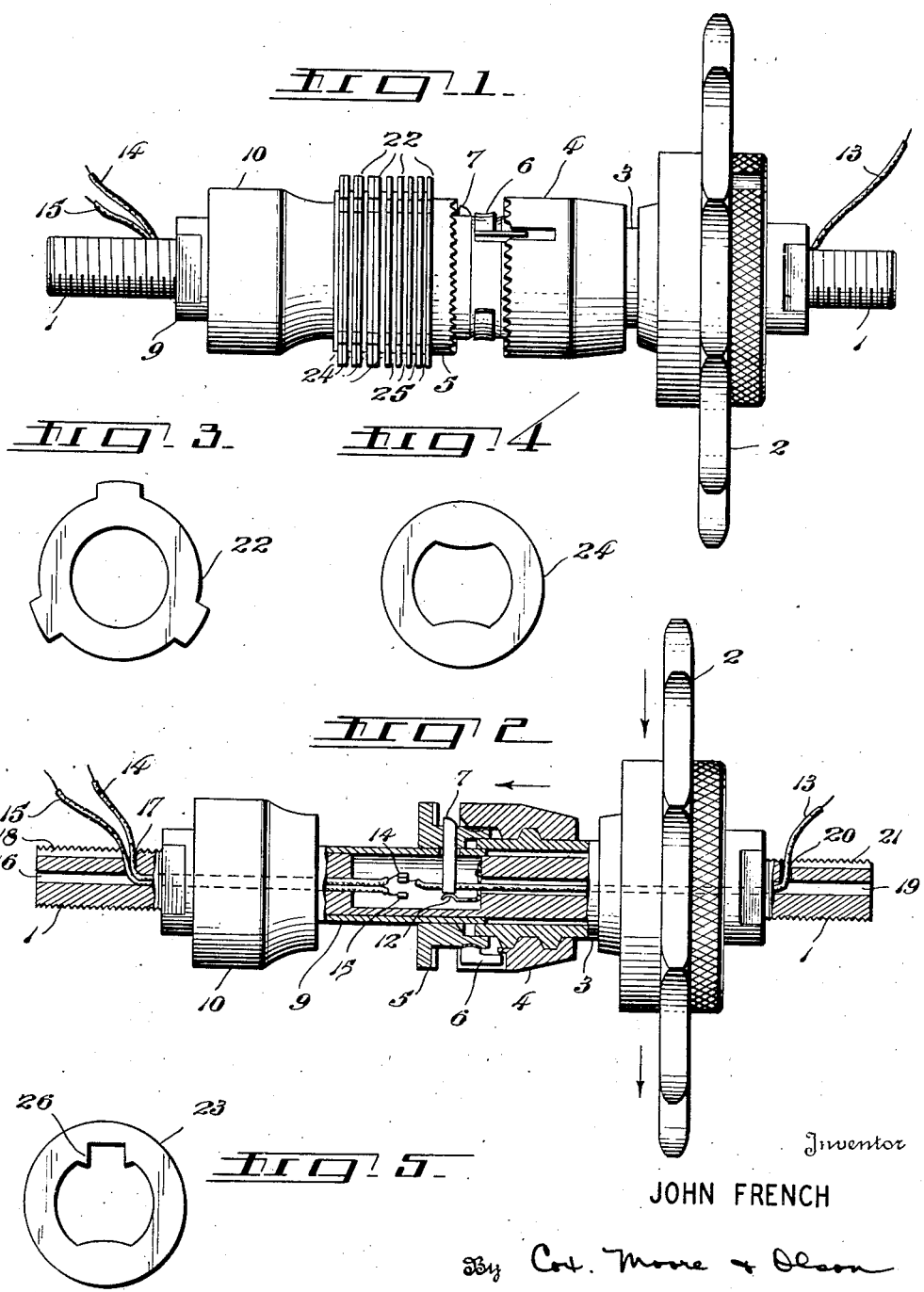
Inventor
JOHN FRENCH
By Cox, Moore & Olson
Attorney Patented Jan. 5, 1943

2,307,581

UNITED STATES PATENT OFFICE 2,307,581

BICYCLE TAIL AND STOP LIGHT

John French, Chicago, Ill.

Application February 24, 1940, Serial No. 320,681

4 Claims. (Cl. 200—52)

The present invention relates to a signalling device and is more particularly concerned with a control switch construction adapted to actuate a signal light on a bicycle or the like.

Yet more particularly, the present invention contemplates the provision of a compact, positively actuable control switch built into a bicycle transmission unit and operable to close a switch during movement of the brake parts to the vicinity of brake actuating position.

It is an important object of the present invention to provide an assembly that is not only compact and closed but one wherein unitary electrical circuit making and breaking means is operated mechanically from means coacting with relatively axially movable brake parts.

Further objects will be apparent from a consideration of the accompanying drawing, wherein Figure 1 is an elevational view showing a coaster brake embodying the present invention. It should be noted that in the present view the sprocket and clutch sleeve have been shifted through a short distance to the right upon the spindle in order to more clearly show the lag spring construction.

Figure 2 is a view taken the same as Figure 1 but showing the spindle and associated parts in section. In this view the braking discs have furthermore been removed in order to more clearly disclose the switch construction.

Figures 3, 4, and 5 are plan views of the locking discs shown in Figure 1.

Referring more particularly to the present drawing, wherein one illustrative embodiment of the invention is disclosed in detail, it will be seen that Figures 1 and 2 disclose a so-called coaster brake of a bicycle. Aside from certain additive improvements to be defined hereinafter more in detail, the coaster brake assembly shown in the drawing is of conventional form and construction (as see, for example, United States Patents Nos. 2,049,972 and 2,054,583) which will be readily recognized by those skilled in the art and the following brief description is solely for the purpose of facilitating the subsequent definition of the novel improved features of the invention.

The coaster brake assembly comprises a spindle 1 upon which is rotatably disposed the usual sprocket 2 having an integral axially extending driving sleeve or worm 3. Disposed upon the driving worm 3 and threadedly interengaging the worm thread or tooth thereof is a laterally shiftable clutch sleeve or driving nut 4. Axially adjacent the left hand extremity of the clutch sleeve 4 as viewed in the figures is located the brake clutch or brake actuator 5. As will be understood by those familiar with this type of device, the clutch sleeve or connector 4 is adapted to be shifted axially by the worm action and may at times approach into engaging abutment with the brake actuator to effectively apply a braking action to the wheel of the vehicle. This action is effected and enhanced by means of a transverse lag or delay spring 6, Figures 1 and 2, embracing the brake actuator where it extends within the clutch sleeve, as clearly shown in Figure 2. Obviously this spring member, being interengaged with the clutch sleeve as shown, applies sufficient frictional tension to the brake actuator to apply a drag to the clutch sleeve, thus tending to facilitate axial shift of the parts. The braking portions of the assembly are completed by the brake anchor 10 locked to the spindle 1 and having a sleeve 9 rigid therewith and extending for a short distance over the central portion of the spindle. Upon this sleeve 9 and between the brake anchor 10 and the brake actuator 5 are disposed a pack or series of brake discs 22, 23 and 24. It will be appreciated that the discs 22 are adapted to interengage with the inner portion of the wheel bushing or hub, not shown, while the other discs, alternately intermediately disposed, tend to exert a frictional gripping action thereon when the brake actuator sleeve 5 moves toward the brake anchor to apply a substantial gripping force.

Referring now to the modification of the foregoing structure in accordance with my present invention, it will be noted that the central portion of the spindle 1, embraced by the sleeve 9, is cut away or relieved centrally to provide a switch chamber, while the sleeve 9 and the brake actuator are slotted on one side thereof to receive a shiftable member 7. The foregoing shiftable member comprises an actuating finger or rod and is mounted upon the sleeve 9. In other words, the actuator 7 extends outwardly of the switch chamber in the axle and is mounted for longitudinal shiftable movement transversely to the axis of the coaster brake assembly and is enclosed substantially completely within slotted portions of the assembly. The upper end of the bar is inclined as shown for cooperation with the end of the actuator sleeve. The member 7 is normally held in the outermost limiting position shown in Figure 2 by means of a yieldable elastic conductor 13, as clearly shown in Figure 2. Attention is particularly directed to the fact that the spindle is axially bored as at 19 and 20 and slotted as at 21 to receive the yieldable elastic conductor 13. As seen in Figure 2, the inner extremity of the wire passes through an axial aperture 25 in the member 7 and extends slightly beyond the block to provide a contact portion. Coacting contact elements include the pair of conductors 14 and 15 disposed within a similar axial channel 16 within the opposite extremity of the spindle extending laterally through a communicating aperture 17 and a channel 18. The ends of the conductors 14 and 15 obviously provide spaced contact elements coacting with the extremity of the opposed conductor 13 as clearly shown in the figures.

In use, I prefer to connect the conductors 13 and 14 in a circuit including a suitable signal lamp, a source of current and a manually controlled switch where desired. The conductor 15 is adapted to be disposed in circuit with a suitable so-called stop light actuated only when the coaster brake parts shift toward brake applying position.

In operation, it will be apparent from the foregoing that when the rider of the bicycle causes the coaster brake to act for braking purposes, the clutch sleeve 4 moves to the left its inclined margin thereby mechanically engaging the inclined surface of member 7, shifting it inwardly and bringing the extremity of the conductor 13 into contact with the conductor 15, thus closing the circuit to and accordingly energizing the stop light, not shown. Upon release of the braking the clutch sleeve 4 moves to the right and the elasticity of the conductor 13 accordingly returns the finger 7 to the position shown in Figure 2, thus opening the stop light circuit. I may, and preferably do, interconnect by soldering the contact extremities of the conductors 13 and 14 so that these conductors remain in continuous electrical contact and they accordingly energize the conventional so-called tail or head light. It will be appreciated that under these circumstances the contact extremity of the conductor 14 will merely swing downwardly toward the spaced contact 15 as the conductor 13 is shifted downwardly in response to movement of the actuator finger 7.

From the foregoing, it will be seen that I have provided an improved compact stop light control housed completely within the axle of the coaster brake and having contacts cooperatively arranged to control the circuit which includes the stop light. It will be apparent from the foregoing that the switch construction is positive in operation in that in response to predetermined relative movement of the brake assembly the switch contacts cooperatively actuate to effect an energization of the stop light circuit.

Attention is directed to the fact that I may relieve the inner margin of the braking collars 23 as at 26, Figure 5, where they overlie portions of the switch actuator lever 7.

Obviously, the invention is not limited to the specific structural arrangement disclosed herein but is capable of other modifications and changes without departing from the spirit and scope of the present invention.

Having thus described my invention what I claim is this:

1. In combination with a coaster brake comprising an axle and a sleeve shiftable axially thereon for applying braking means, means for controlling the energization of a signal device including switch means housed within said axle and an actuating member extending laterally into said axle housing and having an outer portion disposed in the path of said sleeve and an inner portion shiftable radially in response to relative braking actuation of said sleeve for shifting the switch to circuit making position.

2. In combination with a coaster brake comprising an axle assembly having a relatively axially movable part shiftable to effect a braking action, means for controlling the energization of a signal device including switch means housed within said axle assembly and an actuating member extending laterally of the axis into said axle assembly, said actuating member having an outer portion disposed in the path of said relatively movable part and movable thereby when said part is shiftable to braking position, the inner portion of said actuating member having operative engagement with said switch and being shiftable for holding said switch in circuit closing position when the brake is applied.

3. In combination with a coaster brake comprising an axle assembly having a relatively axially movable part shiftable to effect a braking action, means for controlling the energization of a signal device including switch means housed within said axle assembly and an actuating member extending laterally into said axle assembly, said actuating member having an outer portion disposed in the path of said relatively movable part and movable thereby when said part is shiftable to braking position, the inner portion of said actuating member having operative engagement with said switch and being shiftable for holding said switch in circuit closing position when the brake is applied, and spring means for holding said switch and actuator in position for de-energizing said control circuit.

4. In a bicycle coaster brake comprising an axle, at least one axially movable part disposed upon said axle and shiftable to effect a braking action, electric signal switch means housed substantially completely within the axle, and switch actuator means extending out of said axle housing and into the path of said relatively shiftable means, said actuator member and said axially movable part being relatively constructed and arranged to shift said actuator inwardly when contacted by said part, said last named actuator member being operatively associated with said switch and shiftable in response to movement by said relatively shiftable part for actuating the switch into circuit making position.

JOHN FRENCH.